(12) United States Patent
Yarbrough et al.

(10) Patent No.: US 9,845,786 B2
(45) Date of Patent: Dec. 19, 2017

(54) SPAR CAP FOR A WIND TURBINE ROTOR BLADE

(71) Applicant: General Electric Company, Schenectady, NY (US)

(72) Inventors: Aaron A. Yarbrough, Clemson, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 410 days.

(21) Appl. No.: 14/568,515

(22) Filed: Dec. 12, 2014

(65) Prior Publication Data

US 2016/0169194 A1    Jun. 16, 2016

(51) Int. Cl.
F03D 1/06 (2006.01)

(52) U.S. Cl.
CPC ......... F03D 1/0675 (2013.01); F03D 1/0683 (2013.01); F05B 2230/00 (2013.01); F05B 2280/6003 (2013.01); Y02E 10/721 (2013.01); Y02P 70/523 (2015.11)

(58) Field of Classification Search
CPC ..... F03D 1/0675; F03D 1/0683; B64C 3/185; Y02E 10/721
See application file for complete search history.

(56) References Cited

U.S. PATENT DOCUMENTS

| 4,976,587 | A | 12/1990 | Johnston et al. | |
|---|---|---|---|---|
| 7,927,077 | B2 | 4/2011 | Olson | |
| 7,942,637 | B2 * | 5/2011 | Akhtar | F03D 1/0675 29/889.72 |
| 9,599,094 | B2 * | 3/2017 | Dahl | B29C 70/543 |
| 2008/0145615 | A1 * | 6/2008 | Jacobsen | B29C 70/30 428/156 |
| 2011/0135485 | A1 * | 6/2011 | Wang | F03D 1/0675 416/226 |
| 2011/0211971 | A1 * | 9/2011 | Bendel | F03D 1/0675 416/241 R |
| 2011/0243750 | A1 | 10/2011 | Gruhn et al. | |
| 2012/0082554 | A1 | 4/2012 | Baker et al. | |

(Continued)

FOREIGN PATENT DOCUMENTS

DK  WO 2014096002 A2 *  6/2014  ........... B29C 70/543

OTHER PUBLICATIONS

European Search Report and Written Opinion issued in connection with EP Application No. 15197848.3 dated Apr. 21, 2016.

*Primary Examiner* — Christopher Verdier
*Assistant Examiner* — Christopher R Legendre
(74) *Attorney, Agent, or Firm* — Dority & Manning, P.A.

(57) ABSTRACT

The present disclosure is directed to spar caps for wind turbine rotor blades and methods of manufacturing same. The spar cap includes a plurality of plies having varying lengths that are arranged in a tapered configuration. Further, the tapered configuration includes at least an upper portion and a lower portion. The upper portion is configured for attachment to at least one of a pressure side or a suction side of the rotor blade. Further, one or more plies of the upper and lower portions tapers towards an intermediate ply configured between the upper and lower portions of the spar cap. In addition, the intermediate ply has a length that is shorter than the plies in the upper and lower portions.

13 Claims, 6 Drawing Sheets

(56) References Cited

U.S. PATENT DOCUMENTS

2012/0257984 A1* 10/2012 Frederiksen ............ B29C 70/48
  416/232
2016/0169194 A1*  6/2016 Yarbrough ............ F03D 1/0683
  416/226
2017/0002791 A1*  1/2017 Yarbrough ................ B32B 7/00

* cited by examiner

SPAR CAP FOR A WIND TURBINE ROTOR BLADE

FIELD OF THE INVENTION

The present subject matter relates generally to rotor blades of a wind turbine and, more particularly, to improved spar caps for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively light-weight and has structural properties (e.g., stiffness, buckling resistance and strength) which are not configured to withstand the bending moments and other loads exerted on the rotor blade during operation. To increase the stiffness, buckling resistance and strength of the rotor blade, the body shell is typically reinforced using one or more structural components (e.g. opposing spar caps with a shear web configured therebetween) that engage the inner surfaces of the shell halves.

The spar caps may be constructed of various materials, including but not limited to glass fiber laminate composites and/or carbon fiber laminate composites. More specifically, a plurality of plies of composite material are typically laid up in a mold and vacuum infused together to form the spar caps. The ends of the plies, however, can create areas of local stress concentrations, thereby causing the part to delaminate. In addition, the ends of the plies may cause vacuum bag bridging issues which can lead to defects in the resulting part.

Accordingly, there is a need for an improved spar cap that addresses the aforementioned issues. More specifically, a spar cap having an improved layup sequence would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a spar cap of a rotor blade of a wind turbine is disclosed. The spar cap includes a plurality of plies having varying lengths that are arranged in a tapered configuration. Further, the tapered configuration includes at least an upper portion and a lower portion. The upper portion is configured for attachment to at least one of a pressure side or a suction side of the rotor blade. Further, one or more plies of the upper and lower portions tapers towards an intermediate ply configured between the upper and lower portions of the spar cap, and wherein the intermediate ply has a length that is shorter than the plies in the upper and lower portions.

In one embodiment, the spar cap also includes an intermediate portion configured between the upper and lower portions. Further, the intermediate portion includes plies having a shorter length than plies of the upper and lower portions of the spar cap. More specifically, in certain embodiments, the intermediate ply includes the shortest ply of the spar cap.

In additional embodiments, at least a portion of the upper portion tapers towards at least one of the pressure side or the suction side of the rotor blade from the intermediate portion. In further embodiments, at least a portion of the lower portion tapers towards the edge of the spar cap from the intermediate portion.

In further embodiments, all of the plies of the upper and lower portions taper towards the intermediate ply. In particular embodiments, the plurality of plies include at least one of glass fibers, carbon fibers, or mixtures thereof, or similar. In additional embodiments, the plies are infused together via a resin material. Further, the resin material may include any suitable resin, including but not limited to polyester, polyurethane, polybutylene terephthalate (PBT), polyethylene terephthalate (PET), vinyl ester, epoxy, or similar.

In another aspect, the present disclosure is directed to a rotor blade of a wind turbine. The rotor blade includes a blade root and a blade tip, a leading edge and a trailing edge, a pressure side and a suction side, and at least one spar cap. The spar cap includes a plurality of plies having varying lengths that are arranged in a tapered configuration. The tapered configuration has at least an upper portion and a lower portion. The upper portion is attached to either the pressure side or the suction side of the rotor blade. Further, one or more plies of the upper and lower portions tapers towards an intermediate ply configured between the upper and lower portions of the spar cap, and wherein the intermediate ply has a length that is shorter than the plies in the upper and lower portions.

In yet another aspect, the present disclosure is directed to a method of manufacturing a spar cap of a rotor blade of a wind turbine. The method includes arranging a plurality of plies in a first portion of a spar cap mold in a tapered configuration. Another step includes placing at least one intermediate ply in the spar cap mold, wherein the intermediate ply has a length that is shorter than lengths of the plurality of plies in the first portion. The method also includes arranging a plurality of the plies in a second portion of the spar cap mold adjacent to the intermediate ply such that the plies in the first and second portions taper towards the intermediate ply. Still another step includes infusing the plurality of plies together via a resin material so as to form the spar cap.

In one embodiment, the method also includes arranging a plurality of plies in an intermediate portion of the spar cap mold that is configured between the first portion and the second portion. Further, the plies of the intermediate portion of the spar cap mold may have shorter lengths than plies of the first and second portions of the spar cap.

In another embodiment, the method may include arranging a portion of the plurality of plies within the first portion of the spar cap mold such that the plies taper towards at least one of the pressure side or the suction side of the rotor blade from the intermediate portion. In yet another embodiment, the method further includes arranging a portion of the plurality of plies within the second portion of the spar cap mold such that the plies taper towards the intermediate portion from the edge of the spar cap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a spar cap of a rotor blade of a wind turbine and methods of manufacturing same. For example, in one embodiment, the spar cap includes a plurality of plies having varying lengths that are arranged in a tapered configuration and infused together via a resin material such that shorter plies are arranged near or at the center of the spar cap. More specifically, the tapered spar cap includes an upper portion and a lower portion. The upper portion is configured for attachment to either or both of the pressure or suction sides of the rotor blade. Further, one or more plies of the upper or lower portions tapers towards an intermediate ply configured between the upper and lower portions of the spar cap, and wherein the intermediate ply has a length that is shorter than the plies in the upper and lower portions The spar caps of the present disclosure provide numerous advantages not present in the prior art. For example, by re-sequencing the ply order in the spar-cap design, the net shape of the spar cap can be maintained without changing the design process. Further, by placing the shorter plies near the center of the spar cap, resistance to delamination onset can be improved near the end of plies. Moreover, repairs of defects from the manufacturing process can be reduced in size due to the ends of the plies not being affected. Thus, the repairs become smaller in size and require less time and materials. In addition, collected porosity defects can be eliminated because the vacuum bag will no longer bridge over the ply drop, thereby causing "race-tracking" of the resin. Further, the weight of the plies above each of the ply drops can eliminate the open gap available when the bag is placed directly over ply drops.

Figure 1:
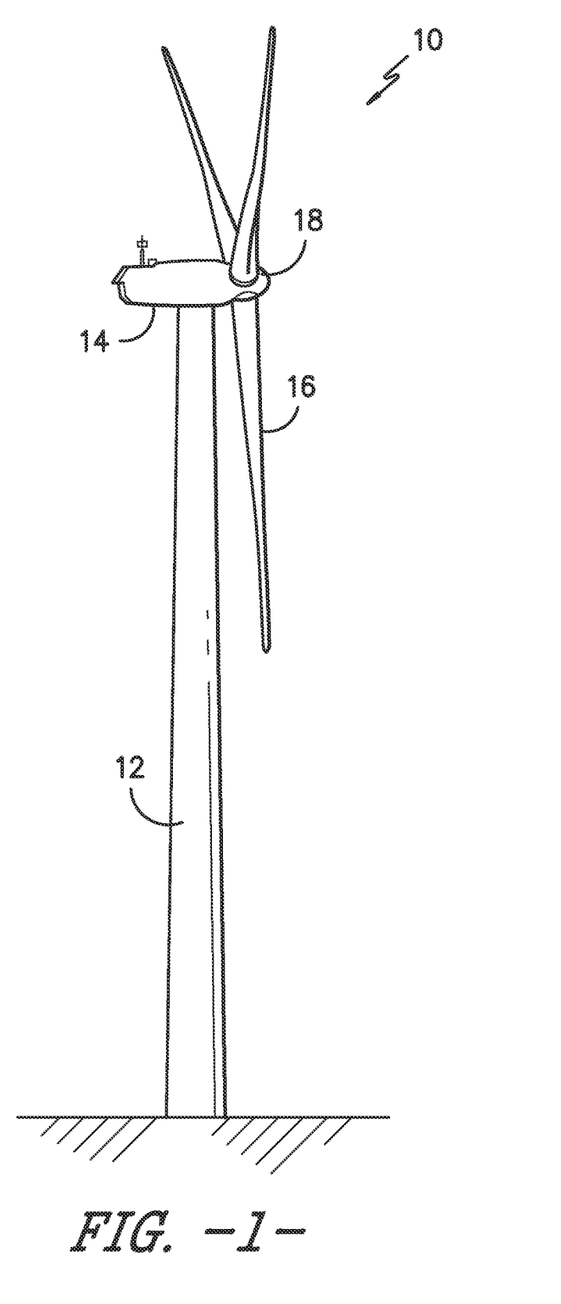
FIG. 1 illustrates a perspective view of one embodiment of a wind turbine according to the present disclosure.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
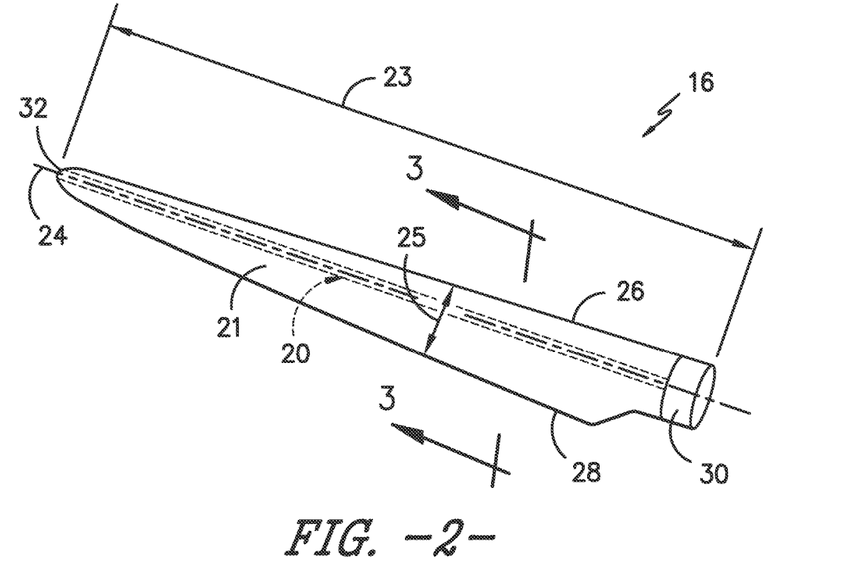
FIG. 2 illustrates a perspective view of a rotor blade according to the present disclosure.
Figure 3:
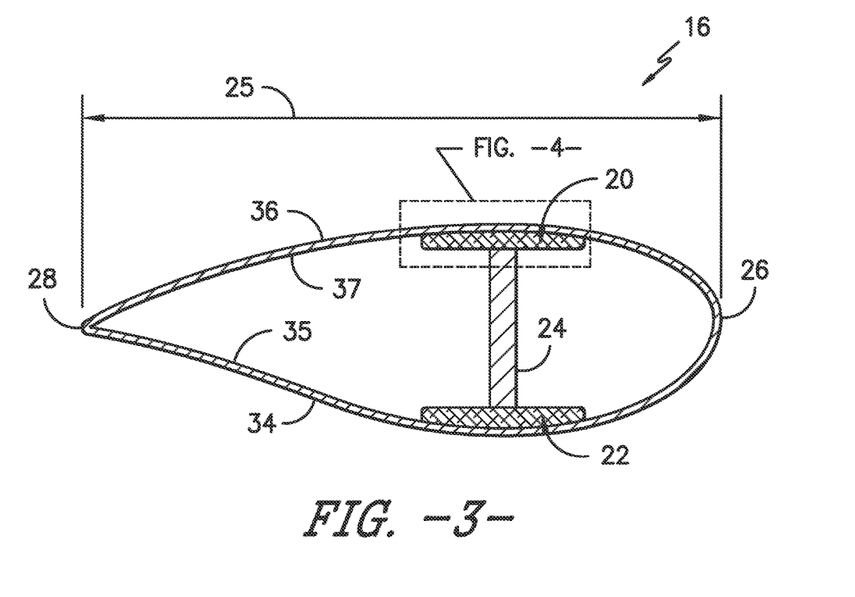
FIG. 3 illustrates a cross-sectional view of the rotor blade of FIG. 2 along line 3-3.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trailing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10.

Figure 4:
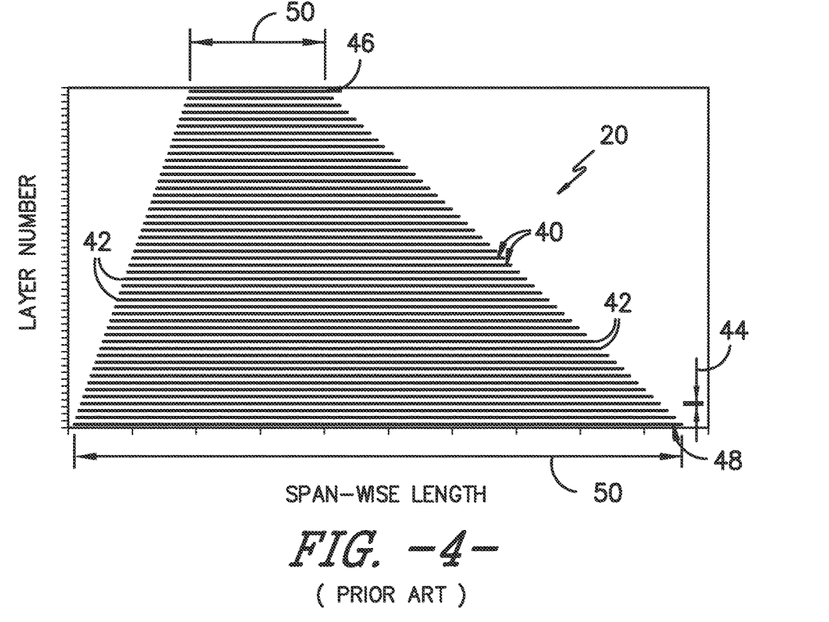
FIG. 4 illustrates a cross-sectional side view of one embodiment of a spar cap according to conventional construction.

Referring now to FIG. 4, a partial, cross-sectional side view of one embodiment of a spar cap 20 according to conventional construction is illustrated. As shown, the spar cap 20 includes a plurality of plies 40 having a conventional tapered arrangement. More specifically, each of the plies 140 may contain one or more fibers or fiber composites, including for example, glass fibers, carbon fibers, or any other suitable fibers. The resin material may include any suitable resin, such as a polymer or more specifically, polyester, polyurethane, polybutylene terephthalate (PBT), polyethylene terephthalate (PET), vinyl ester, epoxy, or similar. Each of the plies 40 has opposing ends 42 containing a certain ply drop equal to the thickness 44 of the ply. During the conventional manufacturing process, the plies 40 are laid up in a mold (e.g. a spar cap mold) according to the illustrated configuration such that the plies 40 may be vacuum infused together to form the spar cap 20. More specifically, as shown, the conventional spar cap 20 contains plies 40 of varying lengths. Thus, the plies 40 are arranged in the mold from shortest to longest or vice versa so as to create a spar cap 20 having a span-wise length 50 that gradually increases from a first ply 46 to a last ply 48. Accordingly, all ply drops of the spar cap 20 are exposed in conventional methods of manufacturing spar caps 20, which can create areas of local stress concentrations, bridging, and/or repairing issues.

Figure 5:
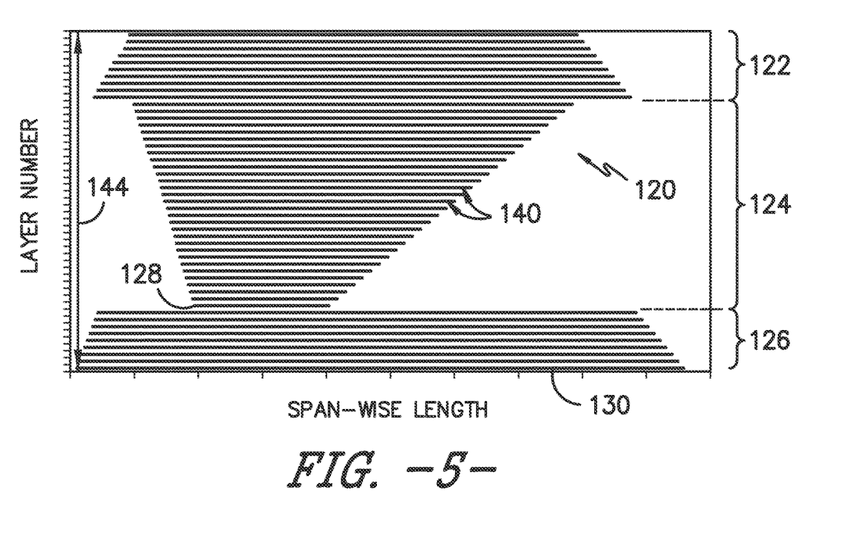
FIG. 5 illustrates a cross-sectional side view of one embodiment of a spar cap according to the present disclosure.
Figure 6:
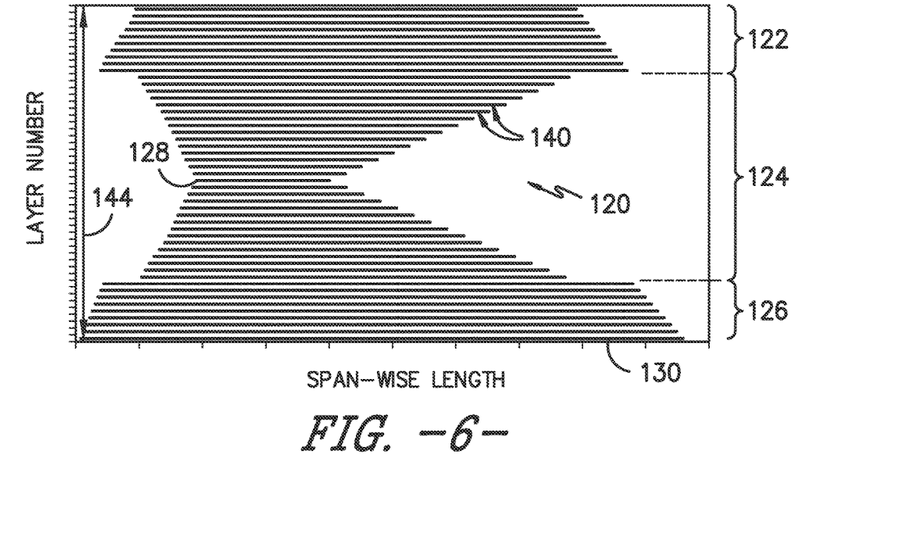
FIG. 6 illustrates a cross-sectional side view of another embodiment of a spar cap according to the present disclosure.
Figure 7:
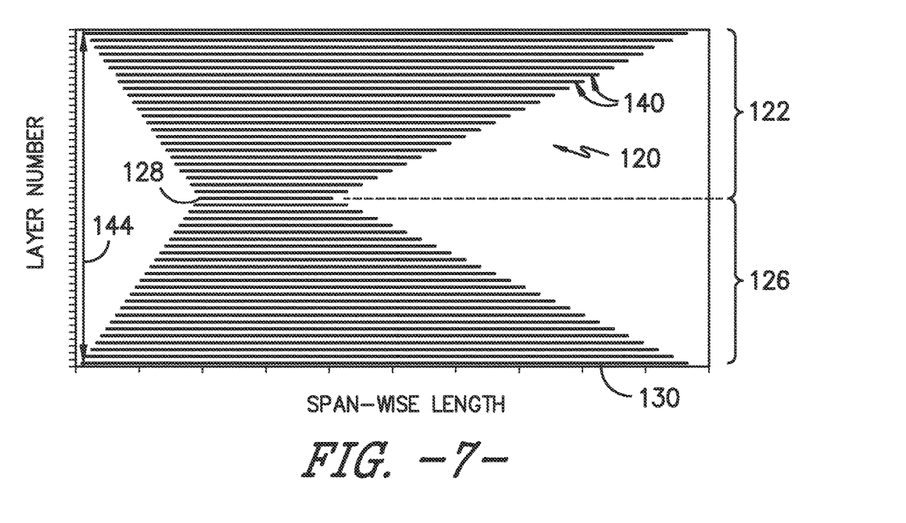
FIG. 7 illustrates a cross-sectional side view of yet another embodiment of a spar cap according to the present disclosure.

As such, FIGS. 5-7 illustrate cross-sectional side views of various embodiments of a spar cap 120 according to the present disclosure that address such issues. As shown, the spar cap 120 includes a plurality of plies 140 arranged in an improved tapered configuration so as to define a thickness 144 of the spar cap 120 according to the present disclosure. For example, as shown, the shorter plies are moved to the center of the spar cap 120 so as to reduce the effects of the ply drops on the design performance and manufacturing of the actual parts. More specifically, the tapered configuration of the spar cap 120 includes at least an upper portion 122 and a lower portion 126. The upper portion 122 is configured for attachment to at least one of the pressure or suction sides 34, 36 of the rotor blade 16. Further, as shown, at least a portion of the plies 140 of the upper or lower portions 122, 126 tapers towards an intermediate ply 128 configured between the upper and lower portions 122, 126 of the spar cap 120.

Referring to the embodiment of FIG. 5, the upper portion 122 of the plies 140 are arranged in a tapered configuration with the shorter plies 140 configured to attach to the pressure or suction sides 34, 36 of the blade 16. Referring to FIGS. 5 and 6, the spar cap 120 may also include an intermediate portion 124 configured between the upper portion 122 and the lower portion 126. Further, the intermediate portion 124 includes plies 140 having a shorter length than plies of the upper and lower portions 122, 126 of the spar cap 120. More specifically, in certain embodiments, the intermediate portion 124 includes at least one intermediate ply 128 that is typically the shortest ply within the spar cap 120.

In another embodiment, as shown in FIG. 6, the upper portion 122 of the plies 140 may be arranged in a tapered configuration with the shorter plies 140 being closest to the blade 16 when installed; the intermediate portion 124 may include the shortest plies 140 of the spar cap 120; and the lower portion 126 may be arranged in a tapered configuration with longer plies 140 corresponding to the edge 130 of the spar cap 120. Thus, in contrast to FIG. 5, the shorter plies 140 of the intermediate portion 124 of FIG. 6 taper from the upper portion 122 to the shortest intermediate ply 128 of the spar cap 120 and then taper back out towards the lower portion 126. In addition, as shown in FIG. 5, the shortest ply 128 does not have to be located directly in the middle of the spar cap 120, but may be arranged at any suitable intermediate distance, such as about two-thirds of the thickness as measured from the upper or lower portions 122, 126 of the spar cap 120.

In still another embodiment, as shown in FIG. 7, the spar cap 120 may simply include an upper portion 122 and a lower portion 126. More specifically, as shown, the upper portion 122 may be configured for attachment to either or both of the pressure or suction sides 34, 36 of the rotor blade 16. Thus, the upper portion 122 may taper from the rotor blade 16 towards the shortest intermediate ply 128. From the intermediate ply 128, the bottom-portion plies 140 taper outward towards an edge 130 of the spar cap 120 to define a thickness 144 of the spar cap 120.

Figure 8:
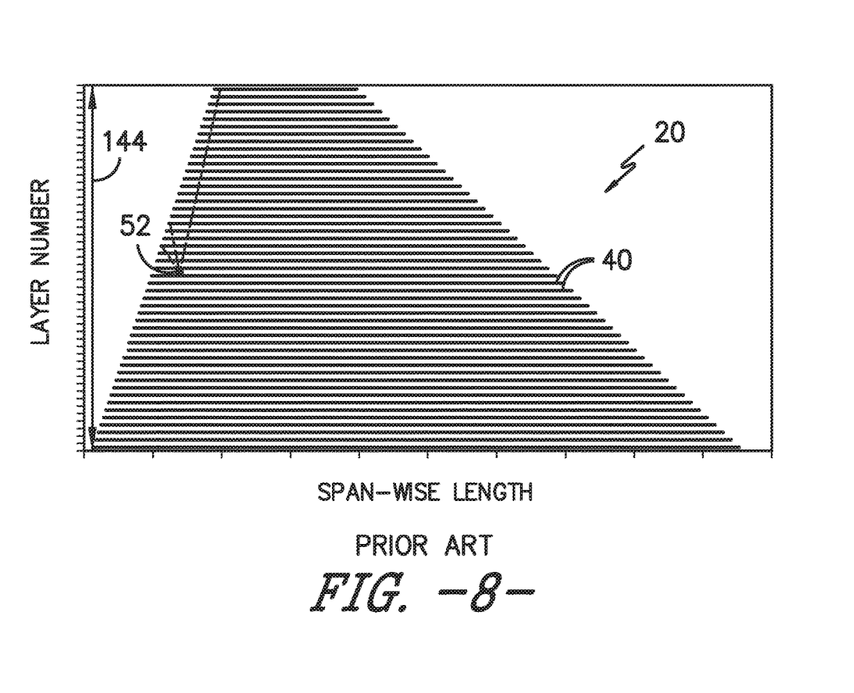
FIG. 8 illustrates a cross-sectional side view of one embodiment of a spar cap according to conventional construction, particularly illustrating a spar cap having a defect therein.
Figure 9:
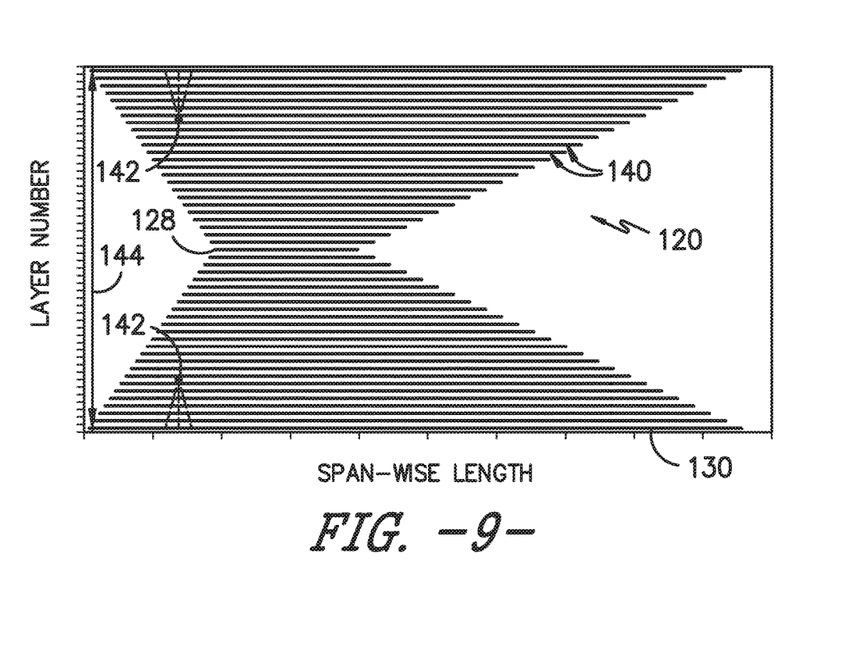
FIG. 9 illustrates a cross-sectional side view of another embodiment of a spar cap according to the present disclosure, particularly illustrating a spar cap having a defect therein.

Referring now to FIGS. 8 and 9, additional advantages of the spar caps 120 constructed according to the present disclosure are illustrated. As shown in FIG. 8, for example, a conventional spar cap 20 is illustrated having a defect 52. Repair of such a spar cap 20 may require the removal of undamaged material as shown by the dashed lines. In contrast, as shown in FIG. 9, by re-sequencing the same plies 40 such that shorter plies 140 are located at or near the middle of the spar cap 120, the repair size of the defects 142 can be drastically reduced for the spar cap 120 as indicated by the dashed lines.

Figure 10:
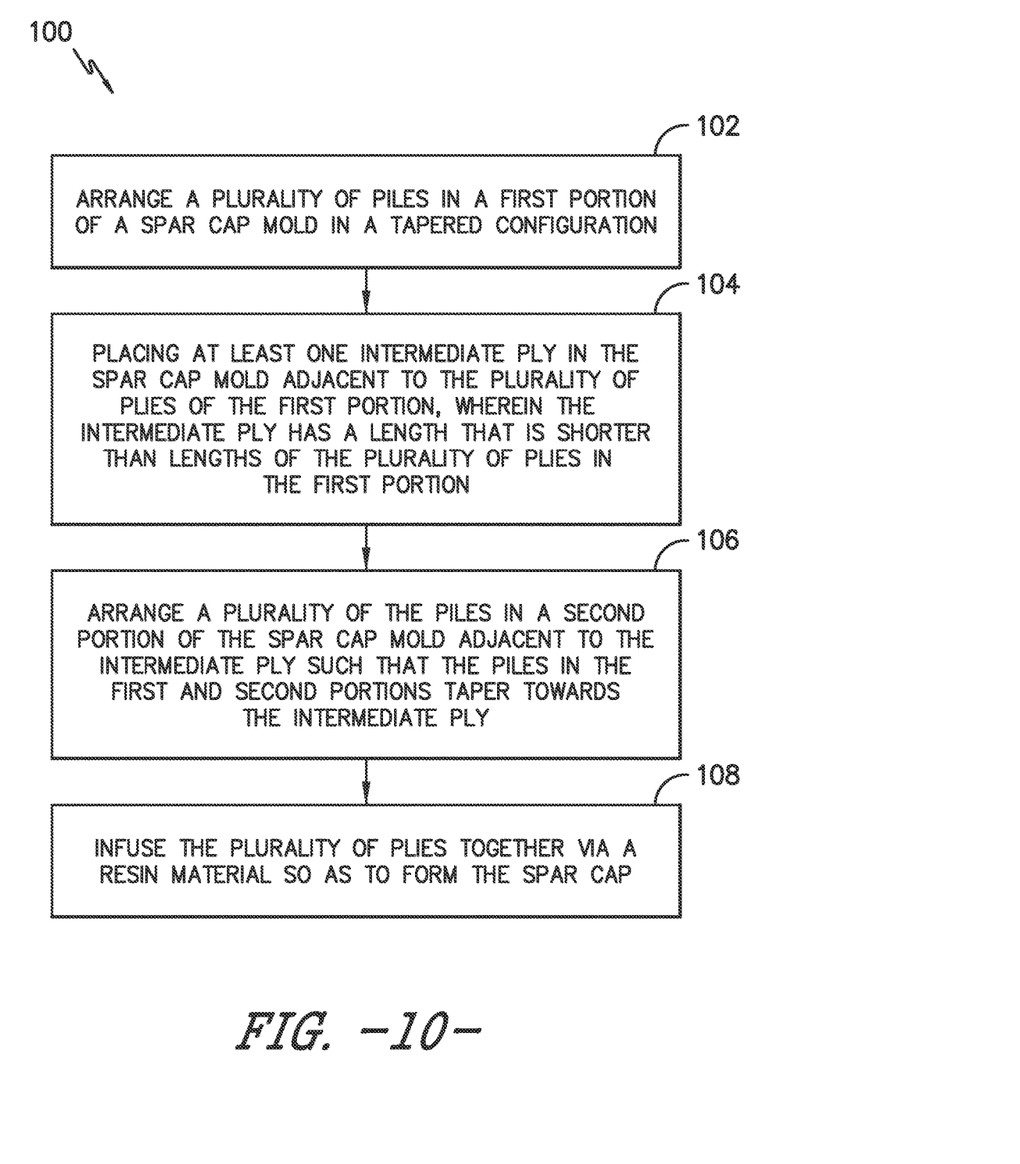
FIG. 10 illustrates a flow diagram of a method of manufacturing a spar cap of a rotor blade of a wind turbine according to the present disclosure.

The present disclosure is also directed to methods for manufacturing spar caps of rotor blades as described herein. For example, as shown in FIG. 10, a flow diagram of a method 100 of manufacturing a spar cap is disclosed. At 102, the method 100 includes arranging a plurality of plies in a first portion of a spar cap mold in a tapered configuration. Another step 104 includes placing at least one intermediate ply in the spar cap mold adjacent to the plurality of plies of the first portion. At 106, the method 100 includes arranging a plurality of the plies in a second portion of the spar cap mold adjacent to the intermediate ply such that the plies in the first and second portions taper towards the intermediate ply. The method 100 also includes infusing the plurality of plies from the first and second portions and the intermediate ply together via a resin material so as to form the spar cap (step 108).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spar cap of a rotor blade of a wind turbine, the spar cap comprising:
   a plurality of plies having varying lengths that are arranged in a tapered configuration, the tapered configuration comprising at least an upper portion and a lower portion, the upper portion being configured for attachment to at least one of a pressure side or a suction side of the rotor blade,
   wherein the upper and lower portions each include a tapered portion that tapers towards an intermediate portion positioned between the upper and lower portions of the spar cap, and wherein plies of the intermediate portion have a length that is shorter than the plies in the upper and lower portions,
   wherein at least one of the tapered portion of the upper portion or the tapered portion of the lower portion taper towards at least one of the pressure side or the suction side of the rotor blade from the intermediate portion when installed within the rotor blade.

2. The spar cap of claim 1, wherein the intermediate portion comprises the shortest ply of the spar cap.

3. The spar cap of claim 1, wherein one or more plies of the tapered portion of the lower portion taper from an edge of the spar cap towards the intermediate portion.

4. The spar cap of claim 1, wherein all of the plies of the tapered portion of the upper and lower portions taper towards the intermediate portion.

5. The spar cap of claim 1, wherein the plurality of plies comprise at least one of glass fibers, carbon fibers, or mixtures thereof.

6. The spar cap of claim 1, wherein the plurality of plies are infused together via a resin material, wherein the resin material comprises at least one of polyester, polyurethane, polybutylene terephthalate (PBT), polyethylene terephthalate (PET), vinyl ester, or epoxy.

7. A rotor blade of a wind turbine, comprising:
   a blade root and a blade tip;
   a leading edge and a trailing edge;
   a pressure side and a suction side; and,
   at least one spar cap, each spar cap comprising: a plurality of plies having varying lengths that are arranged in a tapered configuration, the tapered configuration comprises at least an upper portion and a lower portion, the upper portion attached to either the pressure side or the suction side of the rotor blade, wherein the upper and lower portions each include a tapered portion that tapers towards an intermediate portion positioned between the upper and lower portions of the spar cap, and wherein plies of the intermediate portion have a length that is shorter than the plies in the upper and lower portions,
   wherein at least one of the upper portion or the lower portion taper towards at least one of the pressure side or the suction side of the rotor blade from the intermediate portion when installed within the rotor blade.

8. The rotor blade of claim 7, wherein each intermediate portion comprises the shortest ply of each spar cap.

9. The rotor blade of claim 7, wherein one or more plies of the tapered potion of each lower portion tapers from an edge of the spar cap towards the intermediate portion, respectively.

10. The spar cap of claim 7, wherein all of the plies of the tapered potion of each of the upper and lower portions taper towards the intermediate portion, respectively.

11. A method of manufacturing a spar cap of a rotor blade of a wind turbine, the method comprising:
   arranging a plurality of plies in a first portion of a spar cap mold in a tapered configuration;
   placing an intermediate portion of plies in the spar cap mold adjacent to the plurality of plies of the first portion, wherein plies of the intermediate portion have a shorter length than the plurality of plies in the first portion, wherein one or more of the plurality of plies in the first portion are arranged to taper towards at least one of a pressure side or a suction side of the rotor blade from the intermediate portion when the spar cap is secured in the rotor blade;
   arranging a plurality of the plies in a second portion of the spar cap mold adjacent to the intermediate portion such that the plies in the first and second portions taper towards the intermediate portion; and,
   infusing the plurality of plies together via a resin material so as to form the spar cap.

12. The method of claim 11, wherein the plies of the intermediate portion of the spar cap mold comprise a shorter length than plies of the second portion of the spar cap.

13. The method of claim 12, further comprising arranging one or more plies within the second portion of the spar cap mold such that the plies taper towards the intermediate portion from an edge of the spar cap.

* * * * *